Dec. 26, 1922.
J. W. BIRDZELL.
ANTISKID AND PULL-OUT DEVICE FOR AUTOMOBILES.
FILED FEB. 9, 1922.
1,439,684.
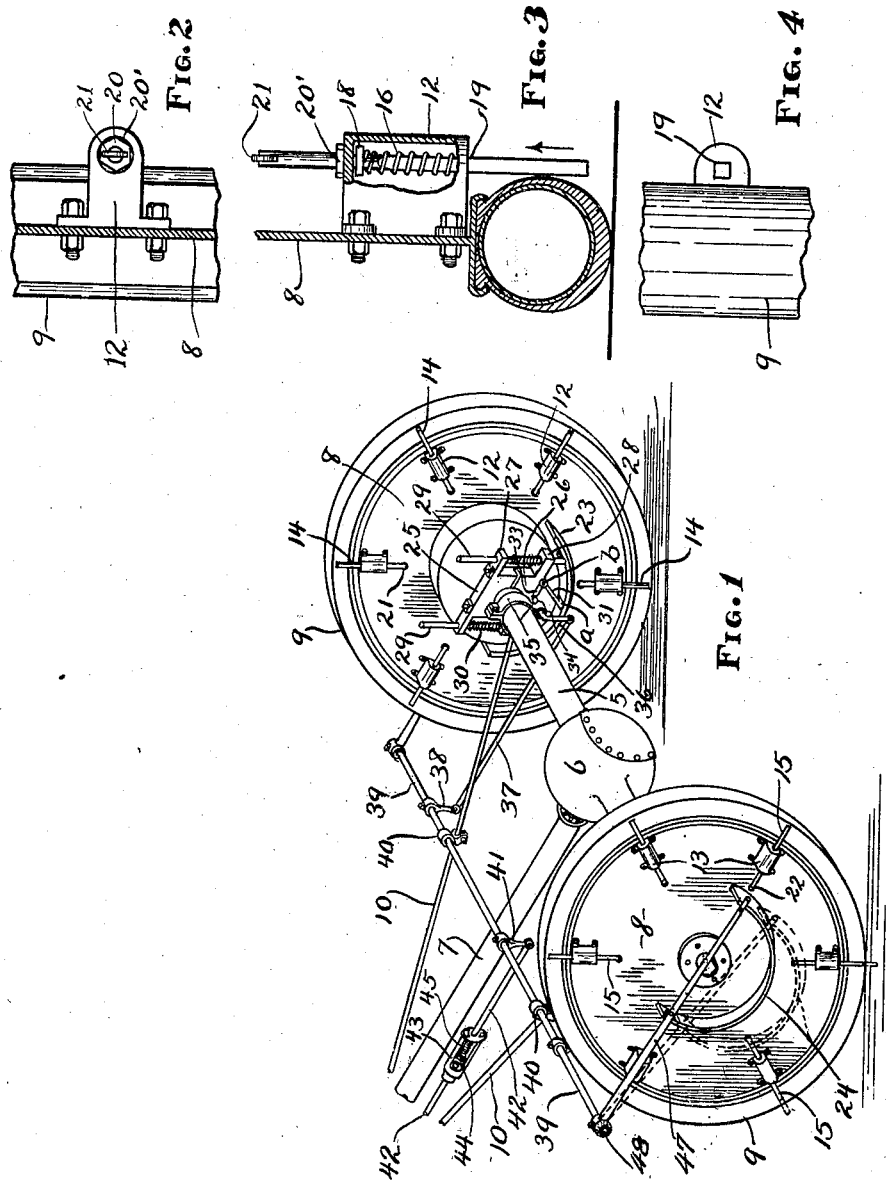
INVENTOR.
John W. Birdzell.
BY
U. G. Charles
ATTORNEY.

Patented Dec. 26, 1922.

1,439,684

UNITED STATES PATENT OFFICE.

JOHN W. BIRDZELL, OF ARKANSAS CITY, KANSAS.

ANTISKID AND PULL-OUT DEVICE FOR AUTOMOBILES.

Application filed February 9, 1922. Serial No. 535,253.

*To all whom it may concern:*

Be it known that I, JOHN W. BIRDZELL, a citizen of the United States, residing at Arkansas City, in the county of Cowley and State of Kansas, have invented a certain new and useful Antiskid and Pull-Out Device for Automobiles, of which the following is a specification.

My invention relates to anti-skid and pull-out devices for self propelled vehicles of all kinds except such as run on rails; it is applicable to both passenger and commercial automobiles, including motor trucks.

The objects of the invention are, first, to prevent lateral skidding of a vehicle whenever so desired by the driver; second, to provide permanently installed mechanism whereby, when the vehicle encounters deep mud or sand and becomes "stalled" by the sinking of one or both of the drive-wheels, the driver can, by simply throwing a lever, place the mechanism in operative condition, in which a series of rigid traction-points will be projected from the periphery of each drive-wheel, and will, by engaging the mud or sand as a fulcrum, enable the motor to pull the vehicle forward or backward to firmer ground. As compared with the use of tire-chains, this device has several advantages, one of the most important of which is that the traction points are not mounted on the tires, and hence do not cut or wear the tires in any respect, at any time.

Referring to the accompanying drawings:

Fig. 1 is a perspective view of one embodiment of the invention as installed on the rear axle of a motor truck having disc-wheels and solid rubber tires; Fig. 2 is a sectional detail view looking radially outward at the inner end of one of the traction-rods; Fig. 3 is a detail view, partly in radial section, showing one of the traction-rods, its spring, and a section of the wheel-web and of a pneumatic tire; Fig. 4 is a detail view seen in the direction of an arrow on Fig. 3.

Referring to Fig. 1, the numeral 5 indicates the rear axle of an automobile truck or wagon, 6, the differential housing, 7, the propeller shaft, 8, the rear wheels which are of the disc type, and 9 the tires thereon.

The frame of the truck as shown, also comprises two radius-rods, 10.

In the practice of my invention I attach to the inner face of each wheel 8, a sufficient number of guides 12, in each of which is slidably mounted a radial traction-rod 14. Each rod, in its normal spring-held position, stands with its outer end in a circle of smaller diameter than that of the periphery of the tire. (See Fig. 3). The helical spring 16 for each rod, bears inwardly upon a stop-collar 18 fixed upon the rod 14. The outer two-thirds of each rod is made non-circular in section, and the hole at 19 is similarly shaped, to prevent rotation of the rod. The inner third of each rod 14 is round, and passes through a screw bushing 20 provided with wrench facets 20'.

The inner end of each rod 14 is provided with an antifriction roller 21, adapted to take the thrust of the rod and of a coacting cam 23, in the manner presently described.

Clamped upon each end of the axle 5 are a pair of iron blocks 25, 26. The upper block has a pair of lugs 27, and the lower block has a pair of lugs 28 which register vertically with the former. Rigidly secured to cam 23 are two upwardly-extending rods 29, each slidably mounted in holes through lugs 27, 28, and each urged upwardly by a helical spring 30.

The cam and the other parts just described are duplicated at the brake end of the opposite side of the axle, but are not shown.

Each of the said cams 23 is (as shown) actuable as follows: A link 31 is pivotally connected to the cam at $a$, and to a rock-arm 33 at $b$. Rock-arm 33 is on a short rock-shaft 34, having its bearing 35 clamped on the axle as shown. Shaft 34 carries a second rock-arm 36, which is actuable through a rod 37 and a rock-arm 38 fixed upon a transverse main rock-shaft 39. The bearings 40 of said shaft are shown as clamped upon, and supported by, the radius-rods 10.

Rock-shaft 39 is actuable by means of a rock-arm 41 and a pull-rod 42, which rod is to be connected with a suitable pedal-lever or manual-lever located in easy reach of the driver.

Rod 42 is divided, as shown, and is connected with a yielding element 43—44, of well known construction, comprising a spring 45 through which the tension is transmitted when the operating lever is actuated.

The cams 23 are laterally registered with the paths of the rollers 21; hence, when it is desired to throw the rods 14 into action, the operator actuates the rod 42 forwardly: this rocks shaft 39, and arms 41, 38; pulls rod 37, rocks arms 36, 33, and depresses link 31, which in turn forces down the connected cam 23 to such a point that the rollers 21, striking in succession the cam as the wheel rotates, will be depressed, with the rods 14, projecting each rod down past the periphery of the tire, so that each rod will enter the mud or sand, form a driving fulcrum, and then be automatically retracted by its spring 16 when its roller has passed off the cam. This description applies to the parts at the inner side of each of the brakes, one of which is shown on the drawing. The operating-lever (not shown) is to be held in operative position only as long as may be required for the vehicle to regain its normal traction on the road. A latch may be provided for holding said lever in operative position.

I prefer, in practice, for use on heavy cars (and possibly on light cars) to equip each drive-wheel with two sets of these traction devices. Therefore I illustrate on Fig. 1, an additional set as it would appear at the outer side of the left-hand wheel.

This construction comprises a series of guides 13 and rods 15, duplicates of those already described. The cam 24 is shaped similarly, or the same as, the cam 23. The cam-actuating means, between the cam and rock-shaft 39, is, however, different. In this construction the cam is secured to and supported by an arm 47, having a hub 48 fixedly mounted on the rock-shaft 39. Thus, when said shaft is rocked to set the cams 23, it will also depress the outside cams 24 (see dotted lines) and make operative the outer series of traction-rods 15.

When the device is in use, and should one or more of the projecting rods encounter an unyielding body, as a large stone, the cam or cams associated with such rod or rods will be forced upward thereby reversely rocking the main shaft 39; this motion will be imparted to the take-up spring 45, and will compress said spring, thus preventing any breakage of parts of the mechanism. This same spring 45 will also function as a safety device in a case where the car is driven from off a soft road onto a hard pavement while the traction-rods are set—that is, extended.

My improvements may be attached to standard wooden wheels of automobiles, by securing the rod-guides 12 13 to the spokes, with U bolts or otherwise.

Such modifications may be employed as lie within the scope of the appended claims.

Having described my invention, I claim as new and desire to secure by Letters Patent:

In an automobile, the combination of a frame, a rear axle, a pair of drive-wheels mounted on said axle, a transverse rock-shaft journaled on said frame, a pull-rod connected to an arm on said rock-shaft, cam-guides mounted on said axle near the ends thereof, rods passing slidably through said guides, cams mounted on said rods, means actuated by rotation of said rock-shaft for depressing said cams, a series of radially arranged, radially slidable traction-rods mounted on each of said wheels, the inner ends of said rods normally passing said cams without contact therewith, but positioned so as to be impinged on by said cams when the latter are held in depressed position.

JOHN W. BIRDZELL.